(12) United States Patent
Yang et al.

(10) Patent No.: US 10,221,990 B2
(45) Date of Patent: Mar. 5, 2019

(54) SYSTEM AND METHOD FOR IMPROVED FIXATION OF FLATS SEQUENCING SYSTEM LINEAR ACTUATOR

(71) Applicant: United States Postal Service, Washington, DC (US)

(72) Inventors: Dongliang Yang, Ellicott City, MD (US); Matthew G. Good, Marriottsville, MD (US); Leung M. Shiu, Gaithersburg, MD (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 15/474,898

(22) Filed: Mar. 30, 2017

(65) Prior Publication Data

US 2017/0205020 A1     Jul. 20, 2017

Related U.S. Application Data

(63) Continuation of application No. 14/553,768, filed on Nov. 25, 2014, now Pat. No. 9,611,976.

(Continued)

(51) Int. Cl.
    *F16M 11/04*     (2006.01)
    *F16M 11/20*     (2006.01)
    (Continued)

(52) U.S. Cl.
    CPC ............... *F16M 1/026* (2013.01); *B07C 1/02* (2013.01); *B07C 9/00* (2013.01); *B65H 1/00* (2013.01);
    (Continued)

(58) Field of Classification Search
    CPC .... F16M 11/043; F16M 11/026; F16M 13/00; F16M 11/2085; F16C 29/004;
    (Continued)

(56) References Cited

U.S. PATENT DOCUMENTS

| 4,842,473 A | 6/1989 | Zbornik |
| 5,688,087 A | 11/1997 | Stepleton et al. |

(Continued)

FOREIGN PATENT DOCUMENTS

| DE | 91 09 849.1 U1 | 7/1991 |
| JP | 1993 (H5)-55935 | 7/1993 |

(Continued)

OTHER PUBLICATIONS

International Search Report and Written Opinion dated Mar. 24, 2015 for International Patent Application No. PCT/US2014/067673, filed Nov. 26, 2014.

*Primary Examiner* — Tan Le

(74) *Attorney, Agent, or Firm* — Knobbe Martens Olson & Bear LLP

(57) ABSTRACT

A system of mitigating force in a mechanical system, the system comprising a frame member, a first rail connected to the frame member, a second rail connected to the frame member and extending along the frame member in parallel to the first rail, an assembly movably engaging the first and second rails, and a first bracket located between the first and second rails, with at least one first bracket attachment secured to the frame member, the first bracket sharing an upper edge with a lower edge of the first rail, such that a downward force applied on the first rail is distributed to the first bracket and the frame member via the at least one first bracket attachment.

16 Claims, 6 Drawing Sheets

Related U.S. Application Data

(60) Provisional application No. 61/909,829, filed on Nov. 27, 2013.

(51) Int. Cl.

| | | |
|---|---|---|
| *B65H 3/00* | (2006.01) | |
| *B07C 1/02* | (2006.01) | |
| *B65H 5/24* | (2006.01) | |
| *F16M 1/026* | (2006.01) | |
| *B07C 99/00* | (2009.01) | |
| *B65H 1/00* | (2006.01) | |
| B65G 59/00 | (2006.01) | |
| B29C 64/141 | (2017.01) | |

(52) U.S. Cl.
CPC ............... *B65H 3/00* (2013.01); *B65H 5/24* (2013.01); *F16M 11/043* (2013.01); *F16M 11/2085* (2013.01); *B29C 64/141* (2017.08); *B65G 59/00* (2013.01); *B65H 2402/20* (2013.01); *B65H 2402/30* (2013.01); *B65H 2402/40* (2013.01)

(58) Field of Classification Search
CPC .... B07C 9/00; B07C 1/02; B65H 1/00; B65H 3/00; B65H 5/24; B65H 2402/20; B65H 2402/30; B65H 2402/40
USPC ......... 248/646, 648, 657, 200.1, 201, 298.1, 248/314, 312.1, 316.8; 414/795.7, 801; 410/143
See application file for complete search history.

(56) References Cited

U.S. PATENT DOCUMENTS

| | | |
|---|---|---|
| 5,730,817 A | 3/1998 | Feygin et al. |
| D398,728 S | 9/1998 | Osborne, Jr. |
| D410,580 S | 6/1999 | Kaffenberger, Sr. |
| 8,177,176 B2 | 5/2012 | Nguyen et al. |
| 8,397,899 B2 | 3/2013 | Krause et al. |
| 8,967,573 B2 * | 3/2015 | Hemmer ............... F16M 13/00 248/317 |
| 9,611,976 B2 * | 4/2017 | Yang ..................... F16M 11/043 |
| 2005/0211534 A1* | 9/2005 | Tefend ................... B65G 13/11 198/860.2 |
| 2010/0072336 A1 | 3/2010 | Swinderman |
| 2010/0150484 A1* | 6/2010 | Watson ................. F16C 29/004 384/55 |
| 2013/0285347 A1 | 10/2013 | Keatley |

FOREIGN PATENT DOCUMENTS

| | | |
|---|---|---|
| JP | H05-55935 | 7/1993 |
| JP | 7-215437 A | 8/1995 |
| JP | H10-258944 | 9/1998 |
| JP | 2000 088762 | 3/2000 |

* cited by examiner

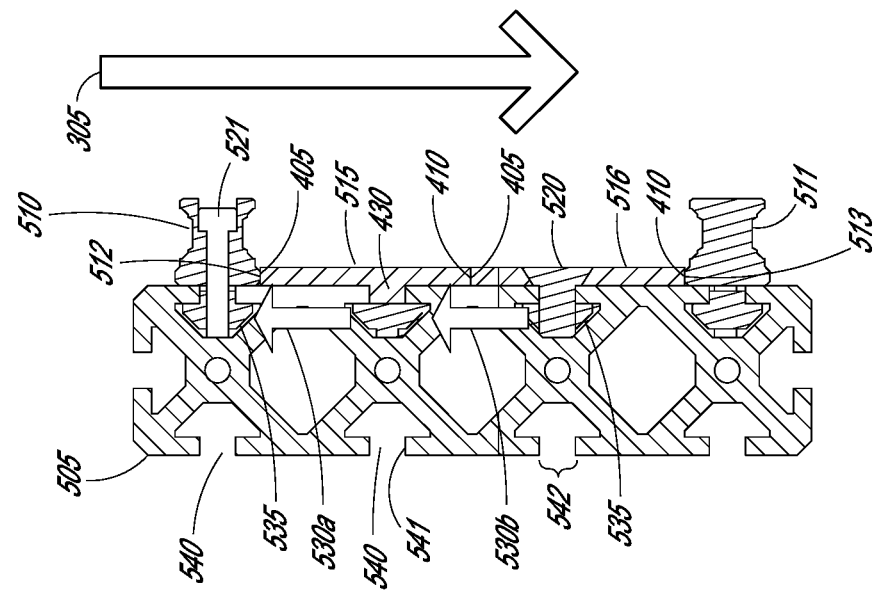
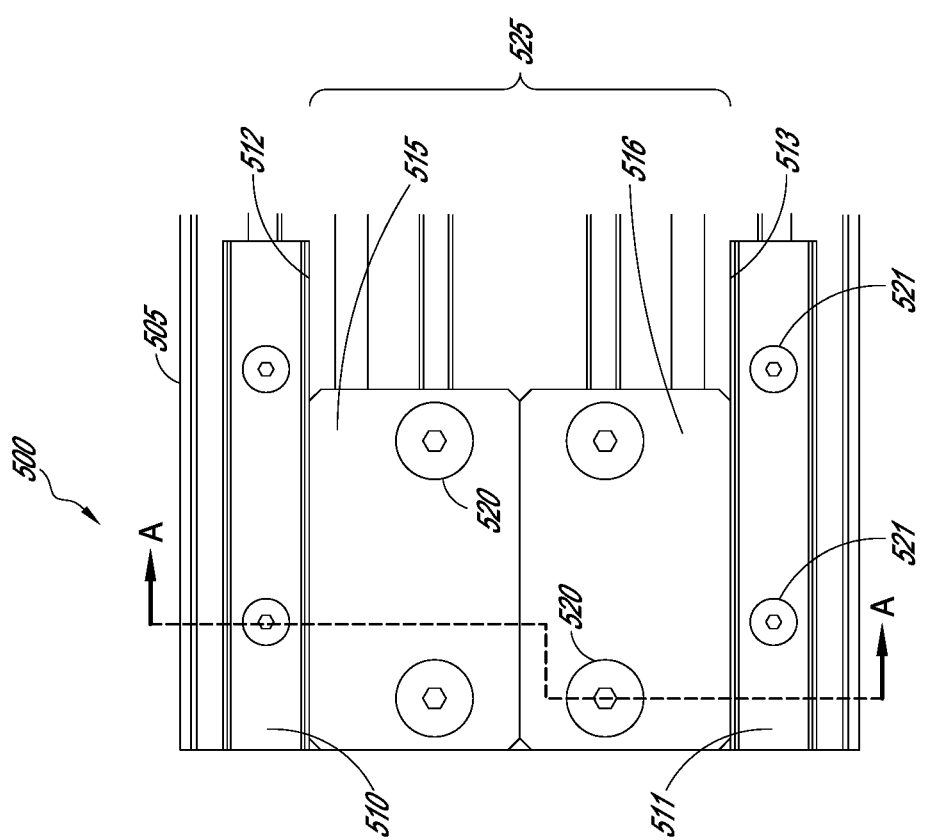

SYSTEM AND METHOD FOR IMPROVED FIXATION OF FLATS SEQUENCING SYSTEM LINEAR ACTUATOR

RELATED APPLICATIONS

The present Application for patent claims priority to Provisional Application No. 61/909,829 entitled "SYSTEM AND METHOD FOR IMPROVED FIXATION OF FLATS SEQUENCING SYSTEM LINEAR ACTUATOR," filed Nov. 27, 2013, and U.S. application Ser. No. 14/553,768, entitled "SYSTEM AND METHOD FOR IMPROVED FIXATION OF FLATS SEQUENCING SYSTEM LINEAR ACTUATOR," filed Nov. 25, 2014, patented as U.S. Pat. No. 9,611,976, each of which is assigned to the assignee hereof and each of which is incorporated by reference herein in its entirety.

BACKGROUND

Field

This disclosure relates to the field of feeding and sorting of items. More specifically, the present disclosure relates to a high speed flats sequencing system used for sorting and feeding items, using sliding guide rails.

Description of the Related Art

Articles, such as items of mail, are frequently provided in bulk and must be sorted into individual articles or items for processing or routing. This sorting into individual items, or singulation, can be done automatically by placing a bulk stack of items or articles into a feeder. However, frequently, the level of operation of the feeding and sequencing system necessary to meet usage demands overwhelms the designs and implementation of the linear actuator, and results in the failure of bolts used in the feeder. If the bolts fail, the flats sequencing system must be shut down to replace the failed bolts, resulting in downtime and creating the opportunity for additional damage to the feeding and sequencing machine from the failed bolts.

SUMMARY

An embodiment may comprise a system of mitigating force in a mechanical system, the system comprising a frame member, a first rail connected to the frame member, a second rail connected to the frame member and extending along the frame member in parallel to the first rail, an assembly movably engaging the first and second rails, and a first bracket located between the first and second rails, with at least one first bracket attachment secured to the frame member, the first bracket sharing an upper edge with a lower edge of the first rail, such that a downward force applied on the first rail is distributed to the first bracket and the frame member via the at least one first bracket attachment.

Another embodiment may comprise a method for mitigating force in a mechanical system. The method comprising installing a first bracket below a first rail, wherein the first rail is secured to a frame member parallel to a second rail such that an assembly may moveable engage the first rail and the second rail and move along the frame member, the first bracket comprising at least one hole in a body of the first bracket, at least one protrusion extending above a first face of the first bracket, and an upper edge of the first bracket contoured to match a lower edge of the first rail, the method further comprising placing the first bracket against the frame member such that a portion of the at least one protrusion extending above a first face of the first bracket rests on a portion of a lip of the frame member, such that at least a portion of a downward force distributed to the first bracket is further distributed to the frame member by the at least one protrusion extending above the first face of the first bracket, and securing the first bracket to the frame member with at least one first bracket securement, such that the first bracket is in contact with the first rail, a portion of the upper edge of the first bracket positioned flush against a portion of the lower edge of the first rail, such that at least a portion of a downward force applied to the first rail is distributed to the first bracket and the feeder system frame member by the at least one first bracket securement.

Another embodiment may comprise a system of mitigating force in a mechanical system, the system comprising at least one frame member, at least one assembly, at least one rail fastened to the at least one frame member so as to provide for horizontal movement along the frame member, the at least one rail configured to support the at least one assembly, wherein the at least one assembly movably engages the at least one rail, and at least one bracket configured to distribute force along the frame, the at least one bracket fastened to the frame immediately below the at least one rail such that a downward force exerted on the at least one rail is distributed to the at least one bracket and the frame.

A further embodiment may comprise an apparatus for mitigating force in a mechanical system, the system comprising means for installing a first bracket below a first rail having an upper and a lower edge, wherein the first rail is secured to a frame member parallel to a second rail having an upper and a lower edge such that an assembly may moveably engage the first rail and the second rail and move along the frame member, the first bracket comprising at least one hole in a body of the first bracket, at least one protrusion extending outward from a first face of the first bracket, and an upper edge contoured to match the lower edge of the first rail, the system further comprising means for installing the first bracket against the frame member such that a portion of the at least one protrusion extending outward from a first face of the first bracket rests on a portion of a lip of the frame member, such that at least a portion of a downward force distributed to the first bracket is further distributed to the frame member by the at least one protrusion extending outward from the first face of the first bracket, and means for securing the first bracket to the frame member with at least one first bracket securement, such that the first bracket is in contact with the first rail, the upper edge of the first bracket flush against the lower edge of the first rail, such that a downward force applied to the first rail is distributed to the first bracket and the feeder system frame member by the at least one first bracket securement.

BRIEF DESCRIPTION OF THE DRAWINGS

FIG. 5A depicts a side view of an embodiment of a system for mitigating force in a linear actuator.

FIG. 5B depicts a front view of a vertical cross section of the embodiment of a system for mitigating force in a linear actuator depicted in FIG. 5A.

DETAILED DESCRIPTION

Figure 1A:
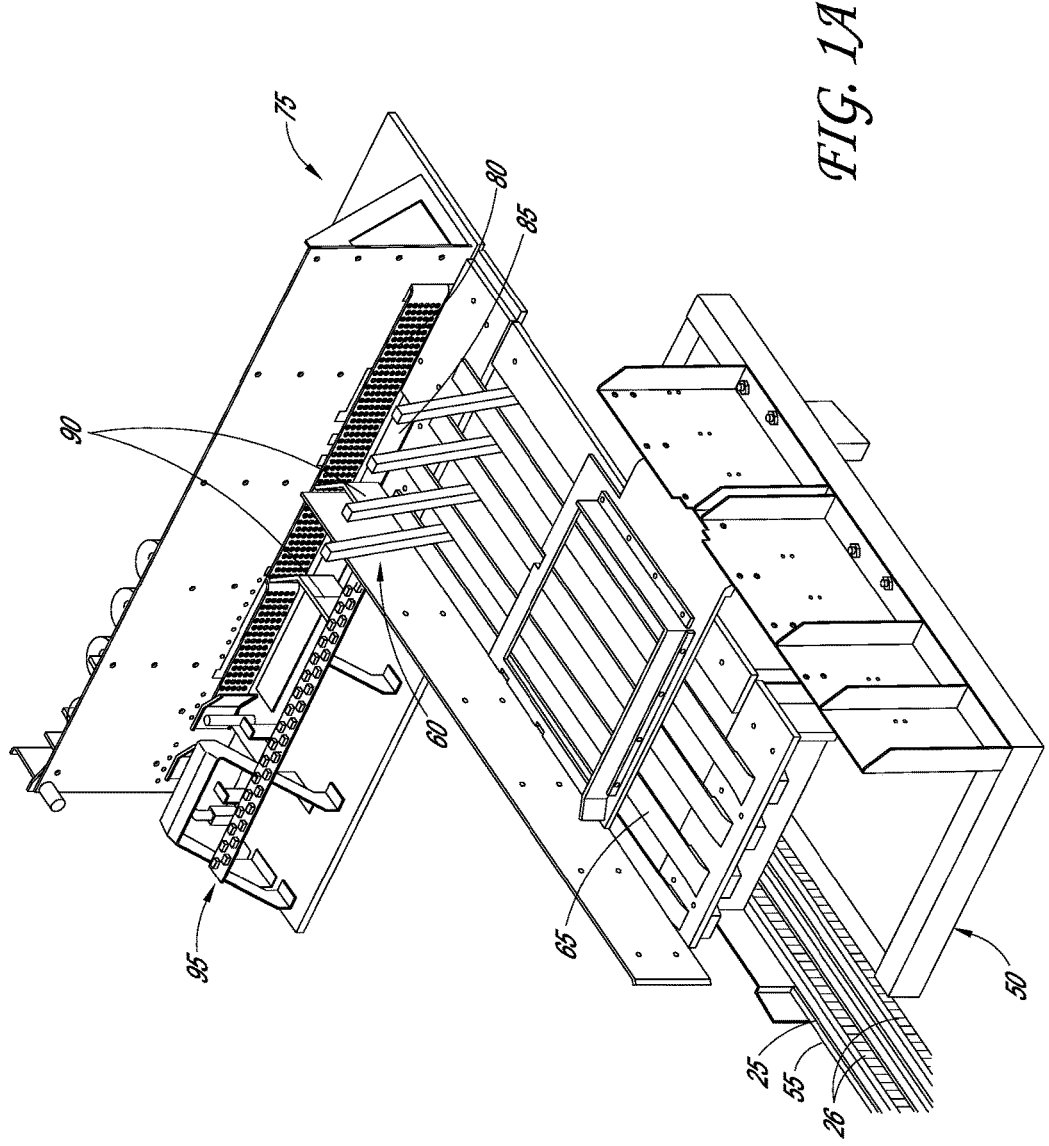
FIG. 1A depicts a perspective view of an embodiment of a stack correction and shingler section of a flats sequencing system.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

As used herein, the term singulation may mean the separation of a stack of articles into single articles that move into a sorting or picking machine in a line of single articles. The term shingulation may mean the separation of articles from a bulk stack where the articles are not entirely segregated from the other articles of the stack. Shingulated articles partially overlap each other, similar to the overlapping pattern of shingles on a roof, and move into a sorting or picking machine in an overlapping, continuous line of articles. As used herein, a singulator may be capable of both singulation and shingulation a stack of articles; the use of the term singulator is used to describe both processes for convenience and ease of description. The term motor is used herein to refer to any device, which provides a mechanical or electrical motive force to a component of the automatic high speed flats feeder. The motors described herein may be mechanically or electrically driven, may be a source of pneumatic or hydraulic pressure, or may be any other type of motors.

The present disclosure relates to systems and methods for preventing flats sequencing system linear actuator bolt failure in an item distribution system. This may include providing a support bracket to be installed between guide rails on a linear actuator having a sliding guide rail. This may also include a method for installing support brackets on linear actuators such that downward force on the assemblies sliding on the guide rails may be distributed to the support brackets and not be borne entirely by the bolts attaching the guide rails to the frame member. For example, one or more support brackets may be installed below a guide rail such that the downward force placed on the bolts, which attach the guide rail to the frame member, may be shared with the installed support bracket. In order to accomplish efficient and effective prevention of bolt failure, the system for preventing bolt failure may require the installed support bracket to be in contact with the guide rail, such that the support bracket can counteract at least some of the downward force felt by the bolts attaching the guide rail in question. The downward force on the support bracket may be distributed to the frame member (using additional bolts or a protrusion distributing the force on the frame member itself) or another support bracket, which may be installed contacting the first support bracket.

As used herein, the terms horizontally and vertically are used with reference to the general layout of a flats sequencing system. The horizontal direction refers to the direction which is generally parallel to the surface on which the flats sequencing system sits in its normal configuration (e.g., the floor or ground). The horizontal direction is also referred to as the x-axis. A direction or movement described as being in the vertical direction is in a direction that is generally perpendicular to the horizontal direction, but need not be exactly perpendicular to the horizontal direction. The vertical direction may be one that extends generally away from the horizontal surface of the flats sequencing system, as will be described more fully herein. The vertical direction is also referred to as the z-axis.

An exemplary distribution entity utilizing the improved fixation of a flats sequencing system linear actuator may be the United States Postal Service. With the large number of items, including letters, flats, parcels, etc., the United States Postal Service handles every day, numerous flats sequencing system linear actuators are in near constant use in various locations across the country. For example, the United States Postal Service delivers to more than 528 million mail pieces to over 152 million destinations (addresses) every day. As such, minimizing linear actuator downtime is of critical importance and a valuable benefit. Although the United States Postal Service is discussed herein as an exemplary distribution entity, it will be understood that this disclosure is not limited thereto.

A distribution network may comprise multiple levels, any one of, or each of which may utilize linear actuators in a flats sequencing system. For example, a distribution network may comprise regional distribution facilities, hubs, and unit delivery facilities, or any other desired level. Each of these facilities may utilize flats sequencing systems in order to properly sort and distribute items as required en route to delivery to a final destination. For example, a nationwide distribution network may comprise one or more regional distribution facilities having a defined coverage area (such as a geographic area), designated to receive items from intake facilities within the defined coverage area, or other regional distribution facilities. The regional distribution facility can sort items for delivery to another regional distribution facility, or to a hub level facility within the regional distributional facility's coverage area. A regional distribution facility can have one or more hub level facilities within its defined coverage area. A hub level facility can be affiliated with a few or many unit delivery facilities, and can sort and deliver items to the unit delivery facilities with which it is associated. In the case of the United States Postal Service, the unit delivery facility may be associated with a ZIP code. The unit delivery facility receives the items, sorts and stages the items for delivery to the destinations within the unit delivery facility's coverage area.

FIG. 1A shows a perspective view of an embodiment of a stack correction and shingler of a flats sequencing system, which may be used in the distribution network discussed above. The stack correction and shingler may comprise a lower paddle assembly 50, as discussed below in FIG. 1B, which may comprise a linear actuator 55, to be discussed in more detail below. The lower paddle assembly 50 of FIG. 1B may be used to move items placed on the lower paddle assembly 50 to the shingling assembly 75 of the flats sequencing system. The lower paddle assembly 50 may operate by using a linear actuator 55 so that stack correction tines 60 may travel horizontally along the linear actuator 55. The stack correction tines 60 may be used to ensure the items placed on the lower paddle assembly 50 maintain proper orientation and placement for subsequent shingling and sorting by the shingling assembly 75 of the flats sequencing system. The lower paddle assembly 50 may comprise at least one belt 65 to assist in feeding items from the lower paddle assembly 50 to the shingling assembly 75. The shingling assembly 75 may comprise various vertical belts 80 and trough belts 85 to manipulate items. Additionally, diverters 90 may be used to sort items to various destinations as determined using sensors 95 and controller 96 (not shown). The vertical belts 80 and the trough belts 85 may transfer items from the area where the lower paddle assembly 50 and the shingling assembly 75 meet. The vertical belts 80 and the trough belts 85 may transport the items to diverters 90, which may divert the items to different systems or areas for further sorting or distribution to end locations, dependent upon where in the distribution process the flats sequencing system may be in operation. As discussed above, a regional distribution facility may use a flats sequencing system comprising the lower paddle assembly 50 and the shingling assembly 75 to shingle and sort items destined for a hub level facility within the regional distribution facilities coverage area, the hub level facility also comprising a similar system to sort items for final delivery.

As depicted in FIG. 1A, the linear actuator 55 operating in a flats sequencing systems may be designed to operate using a sliding guide rail comprising one or more guide rails 26. The guide rail 26 may be mounted on a frame member 25 using a bolt 27 or similar method (not shown), where the guide rail 26 runs horizontally along the frame member 25. The guide rail 26 may allow the actuator (or slide assembly 28) to move in the horizontal direction along the guide rail 26 by using a slider 29 or roller mechanism (not shown) along the guide rail 26 (or any similar method of moving along the guide rail). As such, the weights of the slide assembly 28, the guide rails 26, and any additional attachments installed on the slide assembly 28 may create a downward force on the guide rails 26, and thus on the bolts 27 attaching the guide rails 26 to the frame member 25.

Figure 3:
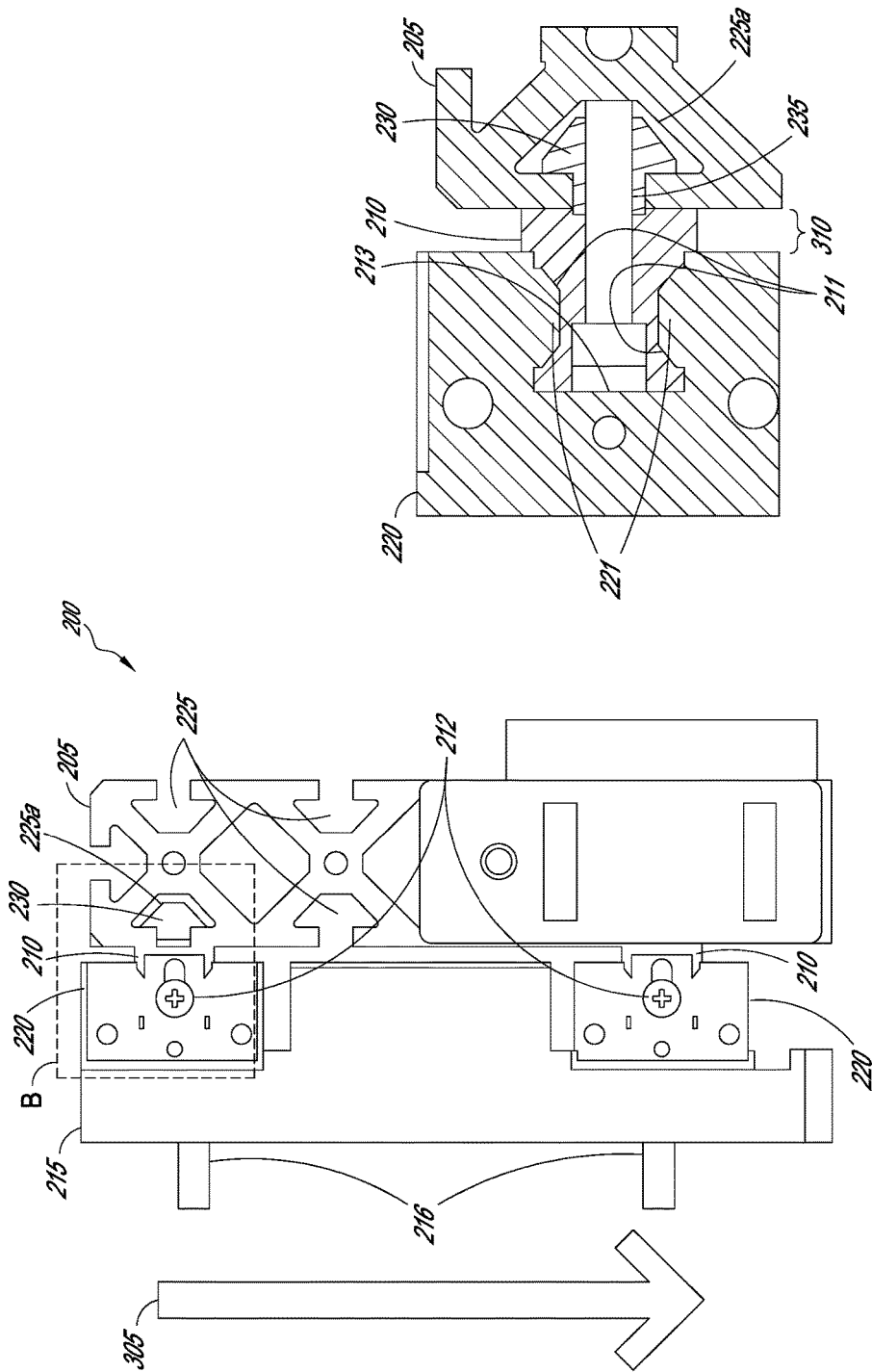
FIG. 3A is a front plan view of an embodiment of a sliding guide rail of a linear actuator prior to installation of the system for mitigating force.
FIG. 3B is an enlarged view of portion B of the system of FIG. 3A detailing the attachment of the slide assembly to the guide rail to the frame member and detailing some limiting restrictions and forces.

As described hereinafter in FIG. 3B, the bolts 235 used to attach a guide rail 210 to a frame member 205 may provide the only counteracting forces against the vertical loads of the above listed items over extended operation and the vibration and additional vertical loads that may be inherent in operation of the flats sequencing system. The bolts 235 may be intended to take an axial load as opposed to shear or shearing force. In a situation as described herein, the bolts 235 may be exposed to parallel shearing forces: the downward force from the vertical load caused by the actuator pushing in one direction at a point in the bolts 235 where the guide rail 210 contacts the bolts 235, and the upward force from the frame member where the bolts 235 are attached may initially cause the bolts 235 to bend. Over time, the continued parallel shearing forcing pushing in opposite directions at different points in the bolts 235 may overcome the fatigue strength of the material from which the bolts 235 are made (e.g., steel) and may cause the bolts 235 to break and fracture. Such breaking may result in required downtime of the machine to repair/replace the bolts 235. Such downtime, though inexpensive in parts and materials, may have a large operational cost due to inability to sort and distribute while the machine is down.

In an embodiment, additional elements may be added to the linear actuator operating in a flats sequencing system to reinforce the linear actuator system. Such reinforcement may allow the downward force on the bolts to be distributed across multiple additional elements such that the shearing forces on the bolts attaching the guide rail to the frame member may be greatly reduced. In an embodiment, the additional elements may comprise support brackets contacting the bottom of the guide rails and attached to the frame member using bolts, thus causing the downward force on the guide rails to be distributed to the additional bolts attaching the support brackets to the frame member. In an alternate embodiment, the additional elements may comprise a support bracket, contacting the bottom of the guide rail, with a physical protrusion that may engage with an indentation, hollow point, depression, or similar, in the frame member such that the protrusion may transfer at least a portion of the downward force on the sliding rail system to the frame member. In another embodiment, the additional element may comprise a support bracket contacting the bottom of the guide rail and distributing a portion of the downward force to additional bolts attaching the bracket to the frame member and having a protrusion that engages with an indentation, etc., of the frame member and distributing a portion of the downward force directly to the frame member.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

Figure 1B:
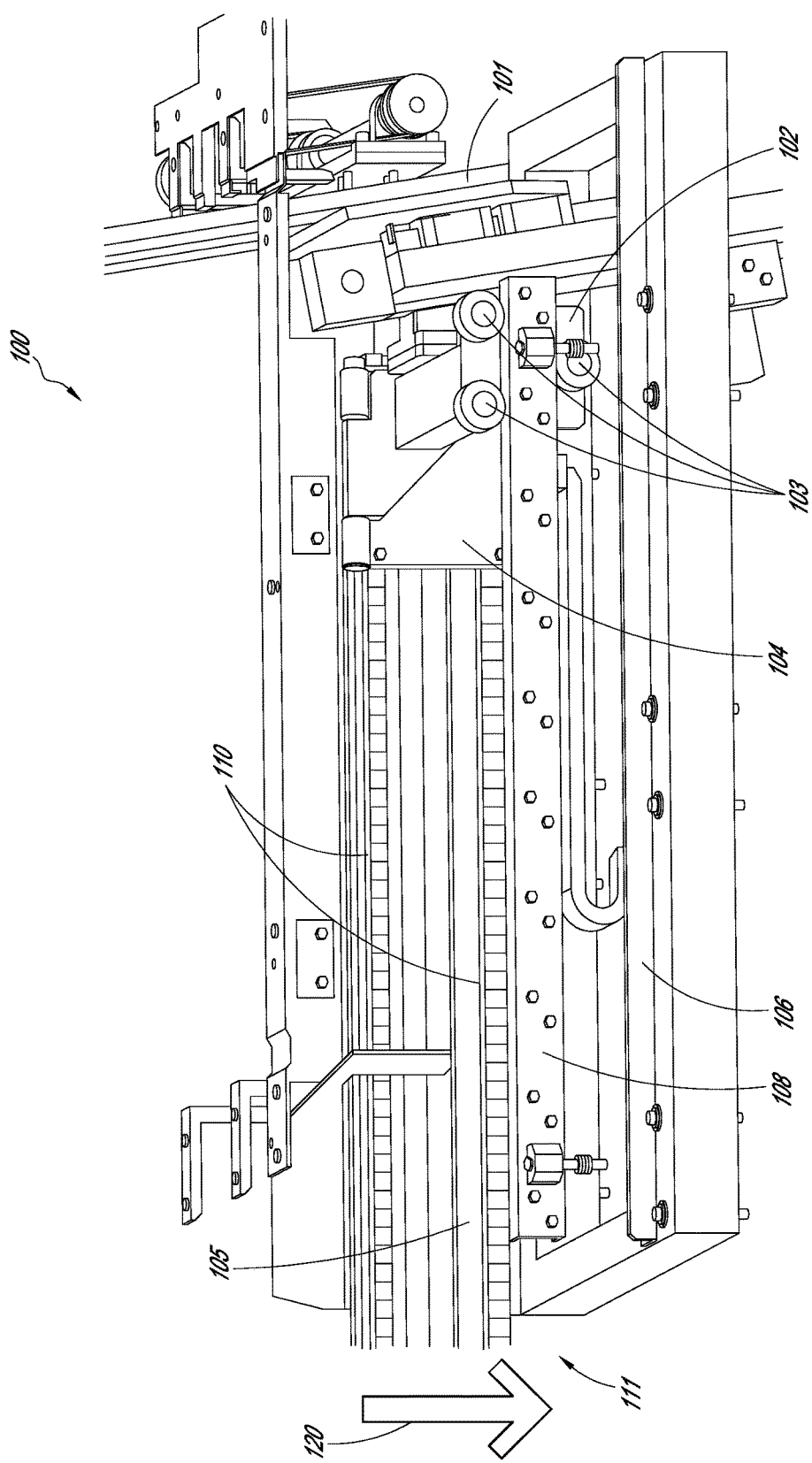
FIG. 1B depicts a perspective view of an embodiment of the lower paddle assembly of a stack correction section of a flats sequencing system.

FIG. 1B shows a perspective view of an embodiment of a portion of a flats sequencing system that utilizes a sliding rail actuator 111, such as a lower paddle assembly 100 of a stack correction section. The depicted portion of the lower paddle assembly 100 includes a portion of a frame member 105, a portion of each of two guide rails 110, and a device attached to a slide assembly 115 (not shown). In an embodiment as depicted, the slide assembly is attached to the guide rails 110 to be moveably supported thereto. The guide rails 110 may allow the slide assembly 115 and the attached device to slide back and forth along the guide rails 110 in the horizontal direction. In an embodiment, a directional force may be shown by the direction of force 120. The lower paddle assembly 100 comprises a support member 101 which may be connected to a cross member 102. The cross member 102 comprises rollers 103 disposed at one end, and may be connected to a drive connector 104 at the other end. The rollers 103 moveably engage a rail 108 which may be connected to the frame 106 and extend parallel to and below one or more belts 107 (not shown). The drive connector moveably engages a frame member. The frame member 105 may be supported by the frame 106. In some embodiments, the frame member 105 may be a belt, a track, a cable, a gear, and pneumatic or hydraulic piston, or other similar device to which the drive connector may moveably connect. The frame member 105 is, in turn, attached to an x-axis motor (not shown). As the x-axis motor operates, the frame member 105 may move along the track, belt, gear, cable, etc., which, in turn, moves the whole lower paddle assembly 100 in the horizontal direction parallel to the path of the belts 107. The lower paddle assembly 100 may be moveable along the length of the frame 106.

Figure 2:
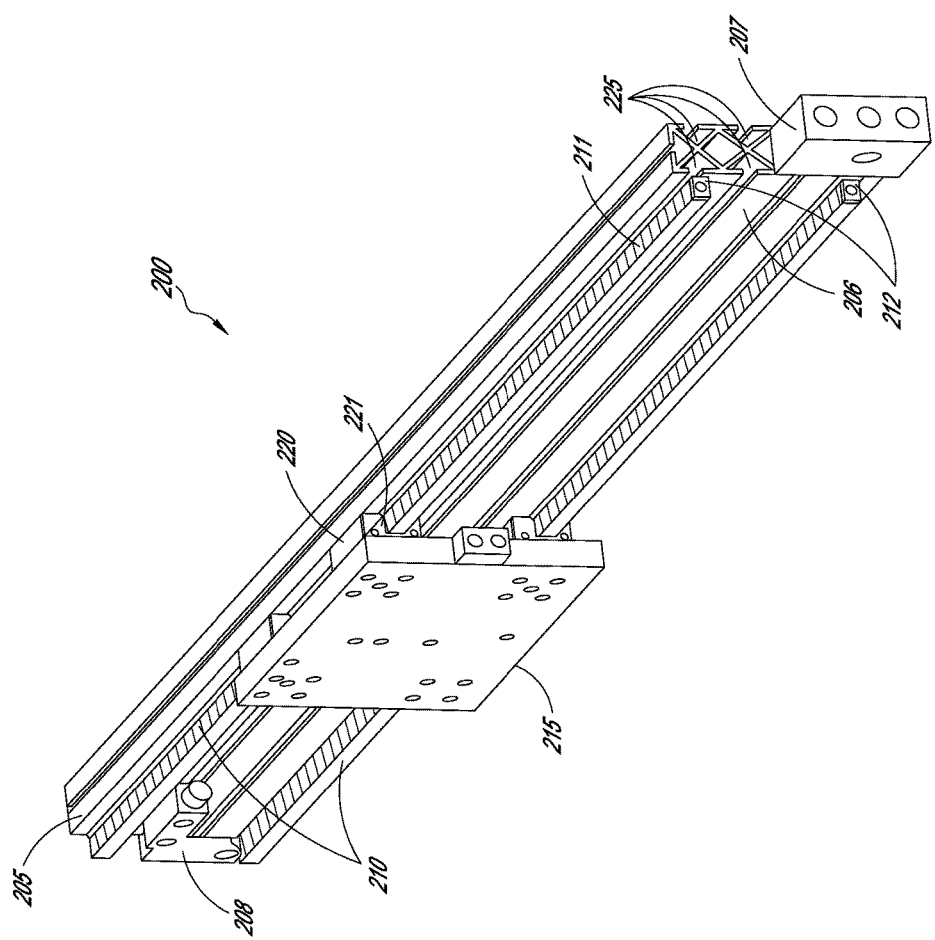
FIG. 2 depicts a perspective view of an embodiment of a sliding guide rail system of a linear actuator with a slide assembly thereon.

FIG. 2 depicts an embodiment of the sliding rail system 200. Sliding rail system 200 may comprise a frame member 205, which supports guide rails 210, which extend along the top and bottom edge of the frame member 205 and extend outward therefrom in a plane perpendicular to a vertical face 206 of the frame member 205. The portion of each of the guide rails 210 which extend outward include a concave trough 211 (shown in more detail below in FIG. 3B) that runs along the top and bottom faces of each guide rail 210 to define receivers for securing sliders 220 onto the guide rails 210. The sliders 220 comprise arms. The arms extend from a vertical face of the slide assembly 215 with each slider 220 having a protrusion or rib 221 that extends longitudally along that face of the slider 220 (shown more clearly below in FIG. 3B). The protrusion or rib 221 is adjacent to the trough 211 of the guide rails 210, such that the protrusion or rib 221 is slideably received and secured within the trough 208. In an embodiment, the frame member 205 may comprise an aluminum extrusion with channels 225 running the length of the extrusion. In an alternate embodiment, the channels 225 may not run the length of the extrusion, but rather only run a portion of the length of the extrusion.

The channels 225 may be used for placing fasteners 226 (not shown) to be used to securely fasten items to the frame member 205, such as the guide rails 210 using bolts 227 (not shown) or any additional equipment which may need to be attached to the frame member 205. This will be further described below in relation to FIGS. 3A-3B, 4, and 5A-5B. In another embodiment, the channels 225 may be used to support items that may rest on the lip of the channels 225, as will be discussed in further detail below (such as bracket protrusion 430 of FIG. 4 below). The guide rails 210 may run parallel to each other in a horizontal direction. The slide assembly 215 may slide along the guide rails 210 in the horizontal direction.

In another embodiment, the frame member 205 may be oriented such that the slide assembly may slide along the guide rails 210 such that a vertical component of a force is exerted on the guide rails 210. The slide assembly 215 may be utilized to support any devices or materials as necessary in operation of the flats sequencing system (e.g., a lower paddle assembly of an automatic stack feeder as shown in FIG. 1B). Guide rails 210 may comprise end guards 212 to ensure the sliders 220 do not slide beyond the end of the guide rail, and thus off the guide rail 210. A brace 207 may be used to attach frame member 205 to the equipment upon which the sliding rail system 200 may be installed. A sensor 208 may be affixed near one end of the guide rail 210 and may be used to detect when slide assembly 215 is at an extent or at a particular position on the sliding rail system 200.

FIG. 3A represents a front plan view of an embodiment of an sliding guide rail 200 of a linear actuator, where the connections between the various components of the slide assembly 215 and the guide rails 210 are more clearly depicted. FIG. 3A depicts an embodiment of the frame member 205 having an X-brace support structure where the majority of the interior space of the frame member 205 may be hollow or empty space. This hollow or empty space may be utilized for running cables, tubing, or placement of fasteners. Additionally, the empty or hollow space may be formed to create the channels 225 discussed above. FIG. 3A more clearly shows the channels 225 that may be contained in the frame member 205. In an alternate embodiment, the channels 225 may not run the entire length of the frame member 205, and may instead be grooves cut into the frame member 205 for the same purpose of providing the ability to fasten to the frame member 205.

Fastener 230 may represent a fastener placed within a channel 225a of the frame member 205 to secure the top guide rail 210 to the frame member 205. Fastener 230 may be a nut or a similar fastener. The fastener 230 may be located within the channel 225a to secure the bottom guide rail 210 to the frame member 205. As will be discussed more fully below, the bolt 227 (not shown) is inserted into the guide rail 210 through a hole (not shown) in the guide rail 210 facing outward from the frame member 205. The bolt threads pass through the hole in the guide rail 210, pass into channel 225a, and engage with the threads of a fastener 230 located therein. The bolt 227 may be tightened such that the guide rail 210 will be drawn flush with the frame member 205, such that no spacing remains between the guide rail 210 and the frame member 205.

In an embodiment, the sliders 220 and the slide assembly 215 may be separate and distinct parts of the sliding rail system 200. In another embodiment, the sliders 220 may be an integrated unit of the slide assembly 215. Additionally, the slide assembly 215 may have pegs 216 extending outward from the slide assembly for attachment. FIG. 3A shows a force 305 as exerted on the guide rails 210 due to a downward force on the slide assembly 215 from any device or material mounted on the slide assembly 215 or any downward force exerted on the slide assembly during operation. FIG. 3A more clearly depicts the guide rail end guards 212 introduced above, which are intended to ensure the sliders 220 do not slide off the guide rails 210.

FIG. 3B depicts an enlarged view of section B of FIG. 3A, showing the slider 220 engaging with a guide rail 210 and the guide rail 210 being connected to the frame member 205. FIG. 3B shows an embodiment of slider 220 attached to slide assembly 215 (not shown) as it is slideably connected with the guide rail 210. FIG. 3B also more clearly shows the troughs 211 of the top and bottom faces of the guide rail 210 as discussed above in reference to FIG. 2. The protrusion or rib 221 of the slider 220 is also depicted more clearly. FIG. 3B shows how the troughs 211 of the guide rail 210 engage with the ribs or protrusions 221 of the slider 220 such that the slider 220 (and thus the slide assembly 215) is connected to the guide rails 210. Once connected as such, they cannot move laterally away from the guide rail 210 but may slide along guide rail 210 as discussed above.

FIG. 3B also depicts an embodiment of how the guide rail 210 may be attached to the frame member 205 using a bolt 235 and a fastener 230. The bolt 235 may be installed in the guide rail 210 such that the head of the bolt is not exposed beyond the guide rail 210, but rather, may be recessed in the guide rail 210. The guide rail 210 may contain therein a hole or open space on a face 213 facing away from the frame member 205 through which the bolt 235 may be inserted. The hole may be of two diameters in the guide rail 210. The hole may be wider where the head of the bolt 235 will be inserted, a shoulder where the head of the bolt 235 may rest against the interior of the guide rail 210 and apply force on the guide rail 210, and a narrower portion where shaft of the bolt 235 will pass through the guide rail 210 to an attachment point. The shoulder in the hole allows the head of the bolt 235 to exert appropriate force against the interior of the guide rail 210 to ensure the guide rail 210 is drawn up against the frame 205 such that there is no space remaining between the guide rail 210 and the frame member 205. The diameter of the hole may depend upon the size of the bolt 235 or attachment used. The shaft of the bolt 235 that may protrude from the guide rail 210 may pass into the channel 225a of the frame member 205 and may be secured to the attachment point by the treads of the fastener 230 placed therein. The fastener 230 will allow the bolt 235 to be tightened so as to bring the guide rail 210 closer to the frame member 205 such that they touch. As depicted in FIG. 3B, the head of the bolt 235 may not extend beyond the guide rail 210 such that it impedes slider 220.

Additionally, FIG. 3B depicts an operating space 310. The operating space 310 may represent the clearance distance between the frame member 205 and the slider 220 and/or the clearance distance between the frame member 205 and the slide assembly 215. This distance may represent the width, which any portion of any support bracket may not exceed in order to ensure proper clearance for the sliding block 220 and the slide assembly 215 to be able to move along guide rails 210 on frame member 205.

Figure 4:
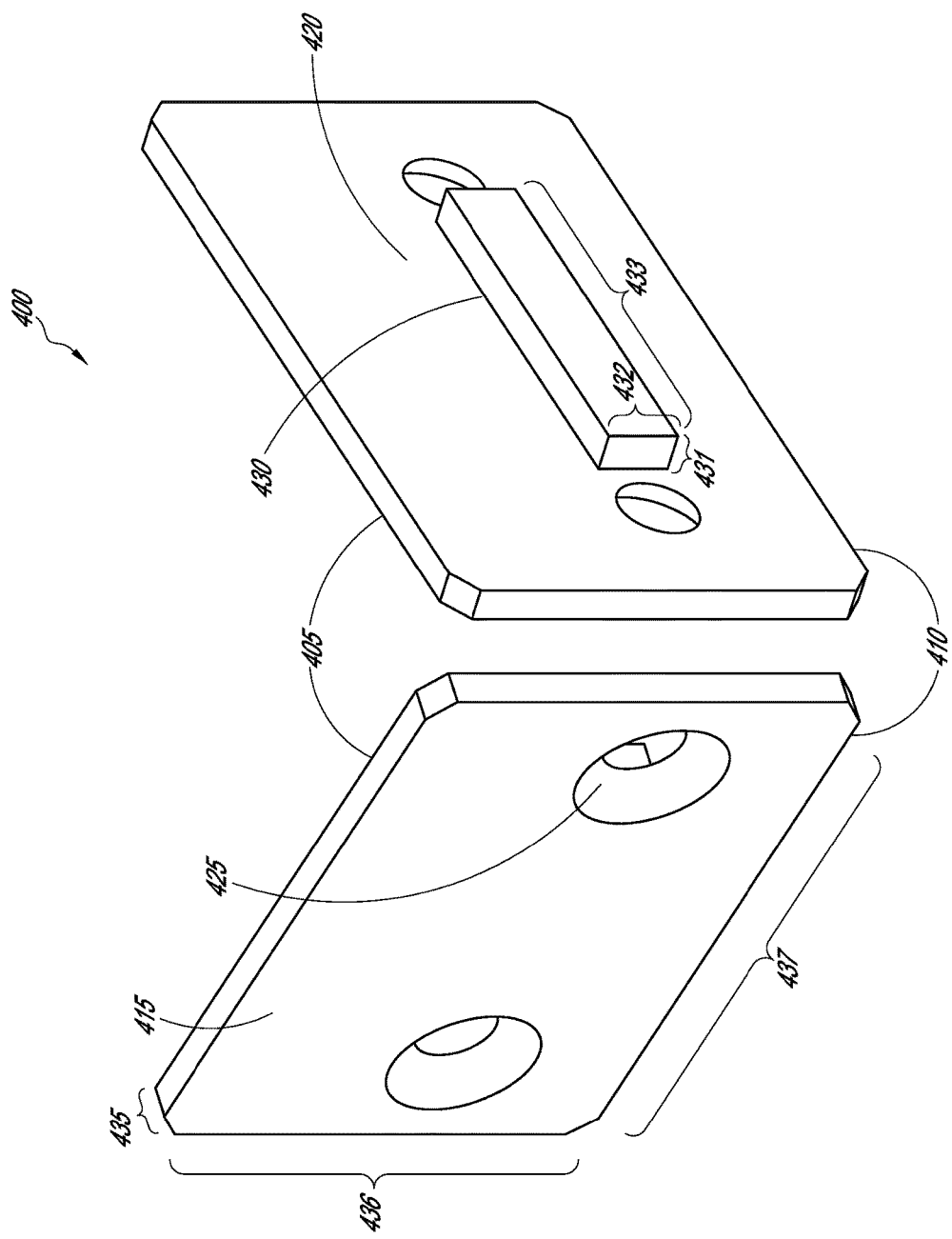
FIG. 4 depicts a perspective view of an embodiment of a support bracket used to mitigate the force on the bolts attaching the guide rails to the frame member in a sliding guide rail system shown in FIG. 2.

FIG. 4 depicts a perspective view of opposing faces of an embodiment of the support bracket 400 that, when used in the system 200, may reduce the force of the force 305 on the bolts 235 that may be used to support the guide rails 210. The support bracket 400 may comprise a rectangular prism shaped piece of steel of height 436, width 437, and thickness 435. In an alternate embodiment, the support bracket 400 may be made of iron, aluminum, or any other material sufficient to support the force of the force 305. The support bracket 400 may have a top edge 405, a bottom edge 410, and opposing faces 415 and 420.

The face 415 of the support bracket 400 may represent the side of the support bracket 400 that may face away from the frame member 205. The face 415 of support bracket 400 may include one or more countersunk holes 425. In an embodiment, the face 415 contains two countersunk holes 425. The countersunk holes 425 may provide for use of a bolt extending therethrough for attachment of the support bracket 400 to the frame member 205, as describe in relation to the bolts and fasteners of FIG. 3B. The countersunk holes 425 are countersunk such that the bolt or screw (or other method of fastening) used to attach the support bracket 400 to the frame member 205 does not extend beyond the face 415 of the support bracket 400, and thus does not impede the slide assembly 215 in its sliding on the guide rails 210 along the frame member 205. As the holes are countersunk, the head of the bolt used to attach the support bracket 400 may apply the appropriate force to the support bracket 400 to draw the support bracket closer to the frame member 205. The diameter of the countersunk hole 425 and the countersink itself may vary dependent upon the size of bolt 235 used.

The face 420 of the support bracket 400 may represent the side of the support bracket 400 that may face towards the frame member 205. The face 420 may also have a protrusion 430 extending from the face 420. The protrusion 430 may provide support for the bracket such that any downward force applied to the bracket is distributed to a surface on which the protrusion 430 rests. The protrusion 430 may be of a height 431, a width 432, and a depth 433. The support bracket 400 may be of continuous thickness 435. In an alternative embodiment, the thickness 435 of the support bracket 400 may be varying across the support. The protrusion 430 of face 420 of the support bracket may be in the same plane as the holes from countersunk holes 425. In an alternate embodiment, the protrusion 430 may be in a plane above or below the plane of the countersunk holes 425.

FIG. 5A depicts a side view of an embodiment of a section of a linear actuator 55 comprising the support system for mitigating force. The system for supporting a linear actuator 500 may comprise a frame member 505. The frame member 505 may be stationary or moving. The frame member 505 may be connected to the first guide rail 510 by one or more bolts 521. The bolts 521 may be replaced by screws, nails, or any similar fastening method that does not result in anything that may protrude from a first guide rail 510 or may impede movement along the first guide rail 510 (as discussed above in relation to FIG. 3B). The first guide rail 510 may have a bottom edge 512 that may run the entire length of the first guide rail 510 (or any length therein). A second guide rail 511 may be connected to the frame member 505 at a distance 525 parallel to the first guide rail 510. The second guide rail 511 may be connected to the frame member 505 by one or more bolts 521 or any similar means as discussed above. The second guide rail 511 may have a top edge 513 that may run the length of second guide rail 511 (or any length therein). Another embodiment may have a different distance 525 as required by the application or may have the first guide rail 510 and the second guide rail 511 not connected to the frame member 505 parallel to each other.

As shown in FIG. 5A, between the first guide rail 510 and the second guide rail 511 there may be installed a first support bracket 515. Referring to FIG. 4 as discussed above, face 415 is seen facing away from the frame member 505 with the countersunk holes exposed. The first support bracket 515 may share an edge with the first guide rail 510 where the first support bracket 515 contacts the first guide rail 510. This top edge 405 of the bracket 400, as referenced in FIG. 4, may be placed against the bottom edge 512 of the first guide rail 510 when the support bracket 400 is intended to support the guide rail 210. In an alternate embodiment, the top edge 405 may be placed in contact with another support bracket 400, or any other device that may need support. The first support bracket 515 may be connected to the frame member 505 by bolts 520 or any similar manner of fastening as discussed above, wherein the heads of the bolts 520 are recessed in the countersunk holes 425 such that they do not protrude beyond the face 415 of the support bracket 515, as will be discussed in further detail below.

As shown, the bolts 520 are placed in the countersunk holes 425 such that the faces of the head of the bolts 520 are visible having a hex-bit head. The shaft of the bolts 520 may pass through the countersunk holes 425 to an attachment point at the frame member 505, as will be discussed below. A second support bracket 516 may be connected to the frame member 505 between the first support bracket 515 and the second guide rail 511 with the face 415 exposed away from the frame member 505. The second support bracket 516 may share a top edge 405 with the bottom edge 410 of the first support bracket 515. The bottom edge 410 of the second support bracket 516 may contact top edge 513 of the second guide rail 511. The second support bracket may be connected to the frame member 505 by bolts 520 or any similar manner as discussed above.

In an alternate embodiment, the first and second support brackets 515, 516 may be replaced by a single support bracket 400 spanning the entire distance 525 between the first and second guide rails 510, 511, where the top edge 405 of the single support bracket 400 may contact the bottom edge 512 of the first guide rail 510 and the bottom edge 410 of the single support bracket 400 may contact the top edge 513 of the second guide rail 511. In another embodiment, the one or more support brackets may not span the entire distance between the first and second guide rails 510, 511, instead only contacting the first guide rail 510 at the bottom edge 512 with the top edge 405 of the one or more support brackets. As discussed above, the height 436, width 437, and thickness 435 of the support block 400 may vary according to embodiment. The height 436 may comprise the entire distance 525 between guide rails 510 and 511. In another embodiment, the width 437 of the support bracket may comprise the entire length of the frame member 505. As discussed above, the fasteners 535 may be placed within the channels 540 to which the support bracket 400 may be attached using bolts 520 through the countersunk holes 425. As discussed above, fasteners 535 may comprise individual nuts or T-nuts. The use of the fasteners 535 allows the force 305 applied downward on the bolts 520 to be distributed to the frame member 505 by securing the bolts 520 such that they cannot slip out of the channel 525. The threads of the fasteners 535, as discussed above, engage the threads on the bolts 520 such that tightening the bolts 520 results in causing the frame member 505 and the guide rail 510 to draw together.

FIG. 5B shows a front view of a vertical cross-section of FIG. 5A cut at cross-section A as depicted on FIG. 5A. The embodiment of the cross-section of the system for supporting a feeder system may comprise the frame member 505, the first guide rail 510 with bottom edge 512 and the second guide rail 511 with top edge 513, the first support bracket 515 with top edge 405 and bottom edge 410, and the second support bracket 516 with top edge 405 and bottom edge 410. The bolt 521 as shown may be used to connect the first guide rail 510 to the frame member 505, and the bolt 520 as shown may be used to connect the second support bracket 516 to the frame member 505.

The second guide rail 511 may comprise a bolt 521 (not shown) to connect the second guide rail 511 to the frame member 505. The bolt 521 as shown may attach the first guide rail 510 to the frame member 505 with a bolt head of a wider diameter than the bolt shaft. The bolt shaft, as discussed above, may extend through the hole of varying diameter in the first guide rail and into a channel 540 before attaching to a fastener 535 located therein. Similarly, the first support bracket 515 may comprise the bolt 520 (not shown) to connect the first support bracket 515 to the frame member 505. The bolt 520 as shown may attach the second support bracket 516 to the frame 505 by extending through the countersunk hole 425, into the channel 540, and attaching to a fastener 535 therein.

The head of the bolt 520 may recess into the countersunk hole 425 such that no portion of the head of the bolt is exposed beyond the face 415 of the second support bracket 516. As shown in an embodiment, the support brackets 515 and 516 may have a protrusion (i.e., protrusion 430 of FIG. 4) which may be inserted into a channel 540 in the frame member 505. The protrusion 430 may have a height 432, a depth 431, and a length 433. The protrusion 430 may be designed to be inserted into the channel 540. The protrusion 430 may be of depth 431 that the protrusion will rest on the lower edge 541 of a channel 540. Such a design may allow the protrusion to distribute downward force on the bracket directly to the frame member 505. The width 433 of the protrusion may extend the entire distance of or beyond the width 437 of the support bracket 515/516 or may be a width smaller than width 437 of the support bracket 515/516. The height 432 of the protrusion 430 may be less than the height 542 of the channel 540 of the frame member 505 to allow the protrusion to set into the channel 540 and distribute force to the frame member 505.

Additionally, FIG. 5B shows an embodiment of the loads placed on the sliding rail system by a slide assembly (not shown). Force 305, as discussed above, may represent the downward force from the load of the slide assembly and any attached device/materials. This load may be compounded by the motion of the feeder system or forces exerted on the system during operation or loading of the slide assembly. Force arrows 530A and 530B may represent the upward force supplied by the support brackets 515, 516 as they may be installed in FIG. 5B such that they counteract the force 305. In an embodiment, the upward force represented by the force arrow 530A may be provided by the support bracket 515 with the protrusion 430. In operation, the contact of bottom edge 512 of the first guide rail 510 with the top edge 405 of the first support bracket 515 allows downward force exerted on the first guide rail 510 to be distributed to the first support bracket 515. The protrusion 430 with depth 431 of the first support bracket 515 rests on the lip 541 of a channel 540, wherein the height 432 of the protrusion 430 is less than the height 542 of the channel 540. The protrusion 430 thus distributes at least a portion of the downward force from the first guide rail 510 to the frame member 505 through the first support bracket 515, reducing the downward forces on the bolts 521. In some other embodiment, the upward force represented by the force arrow 530B may be provided by the second support bracket 516 and the bolts 520, the fasteners 535, and the channels 540 used to attached the second support bracket 516 to the frame member 505.

In operation, the contact of bottom edge 512 of the first guide rail 510 with the top edge 405 of the first support bracket 515 allows downward force exerted on the first guide rail 510 to be distributed to the first support bracket 515. The contact of bottom edge 410 of the first support bracket 515 to with the top edge 405 of the second support bracket 516 allows downward force exerted on the first guide rail 510 and distributed to the first support bracket 515 to be further distributed to the second support bracket 516. The bolts 520 may fasten the second support bracket 516 to the frame member 505 as discussed above. Thus, a downward force 305 distributed to second support bracket 516 may be distributed to the frame member 505 via bolts 520 to fastener 535, which is supported by the frame member 505. Thus, the bolts 520 distribute at least a portion of the downward force from the first guide rail 510 to the frame member 505 through the first support bracket 515 and the second support bracket 516, further reducing the downward forces on the bolts 521.

In another embodiment, the first support bracket 515 or the second support bracket 516 may provide an upward force using a combination of the bolts 520, the fasteners 535, and the channel 540 and a protrusion 430 inserted into the channel 540, or any combination therein. As discussed above, the thickness of the support brackets 515, 516 may be limited by the operating space (i.e., operating space 310 of FIG. 3) between the frame member 505 and the slide assembly 215 (not shown). The support brackets 515, 516 at the thickest point may be less than the operating space 310.

Thus, the force mitigating system described herein reinforces the mounting of the guide rail on a frame member so that the early failure of the bolts attaching the guide rails to the frame member is prevented and thus the bolt life of bolts attaching the guide rails to the frame member is lengthened. This force mitigating system provides a low cost solution requiring minimal flats sequencing system downtime to implement due to the simplicity of its design and minimal connection points. Given the simplicity of its design, the force mitigating system may be utilized in even the most constraining space limitations. The system prevents early bolt failure and lengthens bolt life by transferring a portion of the downward force exerted on the bolts attaching the guide rails to the frame member to the frame member via the protrusion extending outward from the support bracket (s) resting on a lip of a channel of the frame member and the bolts attaching the support bracket(s) to channels of the frame member. The distribution of the downward force on more bolts or protrusions reduces the forces on each bolt, thus extending the life of the bolts and reducing the failure rate of the bolts.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the development should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

What is claimed is:

1. A system of mitigating force in a mechanical system, the system comprising:
   a frame member having a vertical face comprising a first channel that forms a lip along the vertical face;
   a guide rail secured to and extending perpendicularly outward from the vertical face of the frame member;

an assembly movably attached to the guide rail and configured to exert a downward force on the guide rail substantially parallel to a plane of the vertical face;

a first bracket located below the guide rail and secured to the vertical face of the frame member, the first bracket having an upper edge in contact with a lower edge of the guide rail, such that the downward force exerted on the guide rail is distributed to the first bracket, wherein the first bracket comprises:

a protrusion configured to distribute, to the frame member, at least a first portion of the downward force distributed to the first bracket when the protrusion contacts at least one edge of the lip formed along the vertical face of the frame member, and at least one bracket attachment configured to distribute, to the frame member, at least a second portion of the downward force distributed to the first bracket via the first channel.

2. The system of claim 1, wherein the first bracket is configured to reduce a shear strain on the guide rail.

3. The system of claim 1, wherein the at least one bracket attachment comprises a countersunk hole and a bolt, wherein the bolt passes through the countersunk hole and couples to a fastener positioned within the frame member.

4. The system of claim 3, wherein the countersunk hole is in a same plane as the protrusion such that the bolt couples to the fastener positioned within the first channel of the frame member.

5. The system of claim 3, wherein the countersunk hole is in a different plane as the protrusion such that the bolt couples to the fastener positioned within a second channel of the frame member.

6. The system of claim 1, further comprising a second bracket located below the first bracket and secured to the vertical face of the frame member, the second bracket having an upper edge in contact with a lower edge of the first bracket, such that the downward force distributed to the first bracket is further distributed to the second bracket.

7. The system of claim 6, wherein the second bracket comprises:

a second protrusion configured to distribute, to the frame member, at least a first portion of the downward force further distributed to the second bracket, wherein the second protrusion contacts at least one edge of a lip of a second channel on the vertical face of the frame member, and at least one second bracket attachment configured to distribute, to the frame member, at least a second portion of the downward force further distributed to the second bracket.

8. The system of claim 6, further comprising a second guide rail located below the second bracket and secured to the vertical face of the frame member, the second guide rail having an upper edge in contact with a lower edge of the second bracket, wherein the assembly is movably attached to the second guide rail and wherein the first bracket and the second bracket have a thickness less than a clearance distance between the assembly movably attached the first and second guide rails and the frame member.

9. A method of mitigating force in a mechanical system, comprising:

distributing a downward force, exerted on a first guide rail secured to a vertical face of a frame member by an assembly movably attached to the first guide rail, the vertical face comprising a first channel that forms a lip along the vertical face, to a first bracket located below the first guide rail and secured to the vertical face of the frame member;

distributing, to the frame member, at least a first portion of the downward force distributed to the first bracket via a protrusion of the first bracket that contacts at least one edge of the lip formed along the vertical face of the frame member; and distributing, to the frame member, at least a second portion of the downward force distributed to the first bracket via at least one bracket attachment of the first bracket.

10. The method of claim 9, wherein the first bracket is configured to reduce a shear strain on the first guide rail.

11. The method of claim 9, wherein the at least one bracket attachment comprises a countersunk hole and a bolt, wherein the bolt passes through the countersunk hole and couples to a fastener positioned within the frame member.

12. The method of claim 11, wherein the countersunk hole is in a same plane as the protrusion such that the bolt couples to the fastener positioned within the first channel of the frame member.

13. The method of claim 11, wherein the countersunk hole is in a different plane as the protrusion such that the bolt couples to the fastener positioned within a second channel on the vertical face of the frame member.

14. The method of claim 9, further comprising:

distributing at least a portion of the force distributed to the first bracket to the to a second bracket;

distributing, to the frame member, at least a first portion of the force distributed to the second bracket via a protrusion of the second bracket that contacts at least one edge of the lip along the vertical face of the frame member; and distributing, to the frame member, at least a second portion of the force distributed to the second bracket via at least one bracket attachment of the second bracket, wherein the second bracket is located below the first bracket and secured to the vertical face of the frame member, the second bracket having an upper edge in contact with a lower edge of the first bracket, such that the downward force distributed to the first bracket is further distributed to the second bracket.

15. The method of claim 14, further comprising a second guide rail located below the second bracket and secured to the vertical face of the frame member, the second guide rail having an upper edge in contact with a lower edge of the second bracket, wherein the assembly is movably attached to the second guide rail and wherein the first bracket and the second bracket have a thickness less than a clearance distance between the assembly movably attached the first and second guide rails and the frame member.

16. A system of mitigating force in a mechanical system, comprising:

means for distributing a downward force exerted on a first guide rail secured to a vertical face of a frame member by an assembly movably attached to the first guide rail, wherein the vertical face comprises a first channel forming a lip along the vertical face, to the frame member;

means for distributing, to the frame member, at least a first portion of the downward force distributed to the means for distributing a downward force to at least one edge of the lip formed along the vertical face of the frame member; and means for distributing, to the frame member, at least a second portion of the downward force distributed to the means for distributing a downward force via a coupled attachment.

* * * * *